(12) United States Patent
Sasaki et al.

(10) Patent No.: US 12,234,850 B2
(45) Date of Patent: Feb. 25, 2025

(54) FASTENING STRUCTURE AND OBJECT DETECTION DEVICE INCLUDING FASTENING STRUCTURE

(71) Applicant: OPTEX CO., LTD., Shiga (JP)

(72) Inventors: Atsuko Sasaki, Otsu (JP); Hiroyuki Tomooka, Otsu (JP); Michinori Noguchi, Otsu (JP)

(73) Assignee: OPTEX CO., LTD., Shiga (JP)

( * ) Notice: Subject to any disclaimer, the term of this patent is extended or adjusted under 35 U.S.C. 154(b) by 581 days.

(21) Appl. No.: 17/456,903

(22) Filed: Nov. 30, 2021

(65) Prior Publication Data

US 2023/0036003 A1 Feb. 2, 2023

(30) Foreign Application Priority Data

Jul. 27, 2021 (JP) ................. 2021-122766

(51) Int. Cl.
*F16B 21/02* (2006.01)
(52) U.S. Cl.
CPC ................... *F16B 21/02* (2013.01)
(58) Field of Classification Search
CPC ... F16B 21/02; F16B 5/0208; Y10T 403/7005
See application file for complete search history.

(56) References Cited

U.S. PATENT DOCUMENTS 2,358,005 A * 9/1944 Green ............... F16B 5/0208
411/554
3,220,078 A * 11/1965 Preziosi ............ F16B 21/086
402/80 P
3,675,280 A * 7/1972 Winslade ........... F16B 21/04
411/552

(Continued)

FOREIGN PATENT DOCUMENTS

DE 4438285 A1 * 5/1996 ............ E05D 5/08
EP 3 369 079 A1 9/2018

(Continued)

OTHER PUBLICATIONS

The extended European search report issued by the European Patent Office on May 12, 2022, which corresponds to European Patent Applicant No. 21211631.3-1205 and is related to U.S. Appl. No. 17/456,903.

*Primary Examiner* — Amber R Anderson
*Assistant Examiner* — Zachary A Hall
(74) *Attorney, Agent, or Firm* — Studebaker & Brackett PC (57) ABSTRACT

The fastening structure is fastening one member and another member via a fastening member, and includes: a fitting portion having a fitting hole; a to-be-fitted portion having a to-be-fitted hole; and the fastening member inserted into the fitting hole. The fastening member has: a trunk portion, between one end and another end of the fastening member; a tool groove at the one end; a come-off prevention portion at the other end, the come-off prevention portion having a greater radius than a radius; and a helical protrusion at a part of the trunk portion. The fitting portion has a helical groove configured to be screwed with the helical protrusion. A radius of the fitting hole is less than the radius of the come-off prevention portion, and a radius of the to-be-fitted hole is not less than the radius of the come-off prevention portion.

8 Claims, 7 Drawing Sheets

(56) References Cited

U.S. PATENT DOCUMENTS

| | | | | |
|---|---|---|---|---|
| 4,188,689 A | * | 2/1980 | Patrin | F16B 21/02 |
| | | | | 411/533 |
| 4,755,092 A | * | 7/1988 | Yaniv | F16B 21/02 |
| | | | | 411/436 |
| 4,893,978 A | * | 1/1990 | Frano | A44B 99/005 |
| | | | | 24/297 |
| 4,981,057 A | * | 1/1991 | von Haas | B23B 31/1071 |
| | | | | 82/158 |
| 5,370,488 A | * | 12/1994 | Sykes | F16B 21/02 |
| | | | | 411/85 |
| 5,607,271 A | * | 3/1997 | Salice | F16B 21/02 |
| | | | | 411/354 |
| 10,072,985 B2 | | 9/2018 | Peterson | |
| 2015/0184686 A1 | | 7/2015 | Hasegawa | |
| 2017/0115165 A1 | | 4/2017 | Peterson | |
| 2021/0199151 A1 | | 7/2021 | Lin | |

FOREIGN PATENT DOCUMENTS

| | | | | |
|---|---|---|---|---|
| FR | 2795850 A1 | * | 1/2001 | G08B 29/046 |
| GB | 2224072 A | * | 4/1990 | A47B 47/03 |
| JP | 2002-158453 A | | 5/2002 | |

\* cited by examiner

FASTENING STRUCTURE AND OBJECT DETECTION DEVICE INCLUDING FASTENING STRUCTURE

CROSS REFERENCE TO THE RELATED APPLICATION

This application is based on and claims Convention priority to Japanese patent application No. 2021-122766, filed Jul. 27, 2021, the entire disclosure of which is herein incorporated by reference as a part of this application.

BACKGROUND OF THE INVENTION

Field of the Invention

The present invention relates to a fastening structure for fastening two members such as a box portion and a lid portion of a housing that stores an electric circuit, or the like, in a passive infrared ray detector for detecting presence of a human body by receiving infrared rays emitted from the human body. In particular, the present invention relates to measures for adding a fastening structure and such a function to a security sensor by means of a simple configuration.

Description of Related Art

Conventionally, object detection devices have been used, e.g., a security device using a passive infrared ray (PIR) sensor or the like that detects infrared rays to detect a target such as a suspicious person or an intruder and determines presence/absence of the target. Such a detection device has a fastening structure (lock structure) between an outer cover member (which may be simply referred to as cover member) to be opened/closed for working or adjustment for the device and a base member for attaching the device to a wall or the like. This structure is important in terms of preventing an opening/closing operation from being performed by a person other than the person concerned such as a service person or a user. In addition, a member such as a general screw made of metal or the like has been conventionally used for the fastening structure, but in recent years, there has been tendency of placing importance also on the design.

One of conventional examples of a housing structure for an electronic device is described in Japanese Laid-Open Patent Publication No. 2002-158453.

However, in the structure in Japanese Laid-Open Patent Publication No. 2002-158453, an individual component for screw come-off prevention, such as an O ring 600 (or spacer collar), is used for preventing coming-off of a screw 400, that is, a plurality of components are used and the number of components increases with the number of screws 400. Thus, the cost increases, and the labor for working such as assembling the housing or replacing components is complicated.

Meanwhile, in some conventional fastening structures, locking is made with one component for opening/closing a housing by a lid-like member. However, since such a member indicates opening/closing by a mark on a surface of the lid, visual confirmation is needed and there is difficulty in opening and closing, and it is also difficult to confirm the opened/closed state (lock state), which needs to be visually confirmed.

DISCLOSURE OF THE INVENTION

Accordingly, an object of the present invention is to provide a fastening structure and an object detection device including the fastening structure, that eliminate the above disadvantages of the conventional art and that at least improve ease of visual recognition and achieve fastening by one component.

Through various studies, the present inventors have found out that the above object is achieved by the present invention shown below.

A fastening structure according to the present invention is a fastening structure for fastening one member and another member via a fastening member provided to the one member, the fastening structure including: a fitting portion having a fitting hole in the one member; and a to-be-fitted portion having a to-be-fitted hole in the other member; the fastening member being inserted into the fitting hole and configured to fit the fitting portion and the to-be-fitted portion to each other by being inserted into the to-be-fitted hole. The fastening member has: a trunk portion having a cylindrical or columnar shape, between one end and another end of the fastening member; a tool groove at the one end; a come-off prevention portion at the other end, the come-off prevention portion having a greater radius in a cross-section thereof than a radius in a cross-section of the trunk portion; and a helical protrusion at a part of the trunk portion. The fitting portion has a helical groove configured to be screwed with the helical protrusion. A radius of the fitting hole is less than the radius of the come-off prevention portion, and a radius of the to-be-fitted hole is not less than the radius of the come-off prevention portion.

With the above configuration, in the fastening structure according to the present invention, the fastening member inserted into the fitting hole is also inserted into the to-be-fitted hole, whereby the fitting portion having the fitting hole in the one member and the to-be-fitted portion having the to-be-fitted hole in the other member are fitted to each other, thus fastening the one member and the other member. Therefore, the fastening can be achieved by one component. In addition, the fastening member has, at the other end, the come-off prevention portion having a greater radius in the cross-section thereof than the radius in the cross-section of the trunk portion. Further, the radius of the fitting hole is less than the radius of the come-off prevention portion, and the radius of the to-be-fitted hole is not less than the radius of the come-off prevention portion. Therefore, the fastening member does not come off from the fitting hole and also can be inserted into the to-be-fitted hole, whereby the above fitting is achieved. Here, the fastening member has the helical protrusion at a part of the trunk portion, and the fitting portion has the helical groove to be screwed with the helical protrusion. Therefore, when the tool is inserted into the tool groove and then is rotated, for example, unlike the conventional case, the fastening member protrudes from the one member by a predetermined length, so that the fastening between the one member and the other member can be released. Thus, at this time, the opened/closed state (fastening state) of the one member and the other member can be confirmed just by looking. As described above, the fastening structure according to the present invention makes it possible to at least improve ease of visual recognition and achieve fastening by one component.

The fastening structure may be configured such that, when a tool is inserted into the tool groove at the one end of the fastening member and then the tool is rotated, the helical protrusion of the trunk portion slides on the helical groove of the fitting portion and the fastening member rotates, so that the fastening member inserted into the fitting hole is inserted into the to-be-fitted hole, thus fastening the one member and the other member with each other, and when the tool is reversely rotated, the fastening member inserted into the to-be-fitted hole is extracted from the to-be-fitted hole and the fastening member protrudes from the one member, so that the fastening between the one member and the other member is released.

With the above configuration, specifically, when the tool is inserted into the tool groove and then is rotated, the fastening member protrudes from the one member by a predetermined length, so that the fastening between the one member and the other member can be released. Thus, specifically, the opened/closed state (fastening state) of the one member and the other member can be confirmed just by looking.

The rotation of the tool may be rotation exceeding 90 degrees. Thus, when a tool such as a slotted screwdriver is inserted into the tool groove and is rotated by, e.g., 180 degrees, an angle exceeding 90 degrees having been conventionally used, the fastening member can protrude from the one member by a predetermined length so as to be visually recognizable and thus fastening between the one member and the other member is released. For example, the lead angle and the pitch length of the helical protrusion of the fastening member are adjusted to such values that the fastening member protrudes from the one member by the predetermined length so as to be visually recognizable as described above. It is noted that, with rotation by about 90 degrees having been conventionally used, it is highly likely that the fastening member does not sufficiently protrude even through adjustment, and that, if adjustment is made so that the fastening member sufficiently protrudes, for example, the lead angle becomes excessively great, so that the fastening member might become less rotatable or might readily come off, for example.

The fastening member may be rotatable in a state in which the helical protrusion is released from a screwed state with the helical groove of the fitting portion. Thus, in operation of detaching the one member from the other member, the fastening member can freely spin after sliding of the helical protrusion on the helical groove screwed therewith is finished, whereby the one member and the other member are prevented from suffering a great load, so that the component damage resistance can be improved. In this configuration, the fastening member can be formed such that the radius of the part other than the part having the helical protrusion of the trunk portion is less than the radius of the fitting hole. Thus, in operation of detaching the one member from the other member, after the rotation for releasing the fastening such as rotation exceeding 90 degrees, the fastening member can freely spin and can be prevented from coming off from the fitting portion.

The fastening member may have an engagement portion configured to be engaged with a to-be-engaged portion of the to-be-fitted hole. Owing to this engagement, when the fastening member is inserted into or extracted from the to-be-fitted hole by being rotated with the tool, a click-like feeling is transferred to the worker's hand gripping the tool. Thus, the worker can recognize start of operation of detaching the one member from the other member, and can recognize completion of operation of attaching the one member to the other member. Further, in this case, the fastening member is united with the cover member 100 in the outer appearance, whereby the design is improved.

The fastening member may have, at the come-off prevention portion and a part of the trunk portion, a cut-in portion extending in an axial direction from an end surface of the other end. With this configuration, by compressing the come-off prevention portion in the radial direction so as to narrow the space in the cut-in portion, the come-off prevention portion which has a greater radius than the radius of the fitting hole so that the fastening member does not come off from the fitting portion can be inserted into the fitting portion, whereby it is possible to attach the fastening member to the fitting portion. In addition, owing to the cut-in portion, in the case where the above engagement is provided, the come-off prevention portion is imparted with elasticity by a spring effect, whereby the above click feeling can be more assuredly provided.

The to-be-fitted portion may have a helical groove configured to be screwed with the helical protrusion. With this structure, the fastening member can more stably rotate while being screwed with two kinds of helical grooves, i.e., the helical groove of the to-be-fitted portion and the helical groove of the fitting portion on the same cylindrical surface.

An object detection device according to the present invention includes the fastening structure having any of the configurations described above, the one member is a cover member and the other member is a base member, and an object detection circuit board having a detection-ray detecting element is stored between the cover member and the base member. With this configuration, the object detection device according to the present invention provides the effects of the fastening structure described above, so that the fastening structure at least improves ease of visual recognition and achieves fastening by one component, and also, the object detection device can detect a target such as a suspicious person or an intruder by detecting detection rays.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, an embodiment of the present invention will be described with reference to the drawings. In the present embodiment, as an example of a fastening structure for fastening two members such as a box portion and a lid portion of a housing that stores an electric circuit, or the like, a fastening structure of an object detection device will be described. In the drawings, the same reference numerals denote the same or corresponding parts, and such parts will not be repeatedly described unless particular change or the like is made thereon.

Object Detection Device

Figure 1:
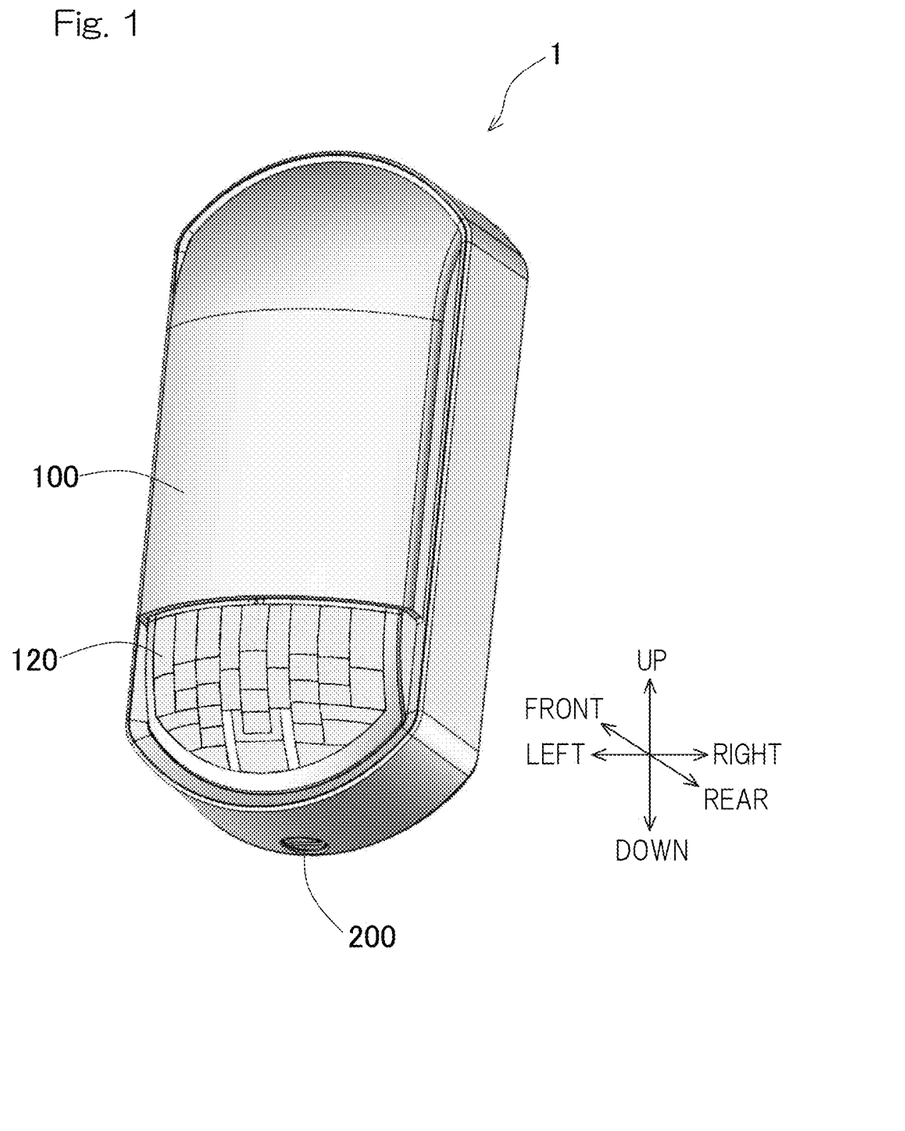
FIG. 1 is an external perspective view of an object detection device including a fastening structure according to an embodiment of the present invention.

FIG. 1 is an external perspective view of an object detection device 1 including a fastening structure described later, according to the embodiment of the present invention. The object detection device 1 detects a target such as a suspicious person or an intruder by detecting infrared rays which are detection rays, for example. The object detection device 1 has a cover member 100 (an example of one member) to be opened/closed for working or adjustment for the device, and an optical member 120 which includes an optical system such as a Fresnel lens and allows detection rays (infrared rays) to transmit therethrough is attached on the lower side of the front surface of the cover member 100.

Figure 2:
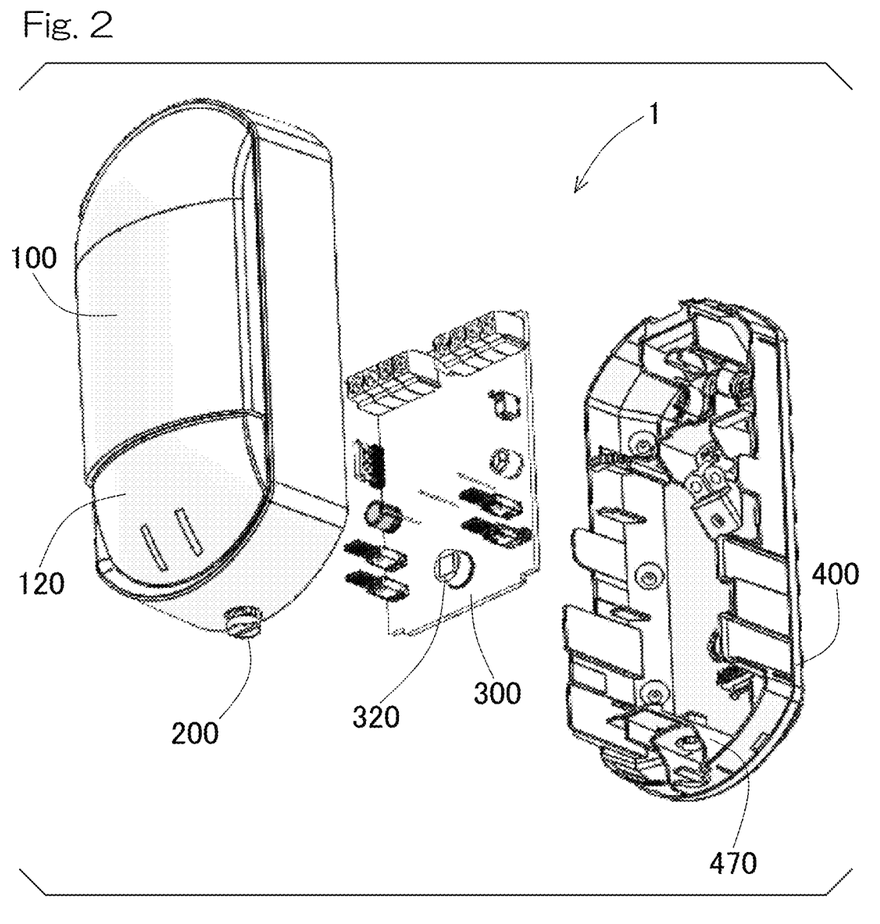
FIG. 2 is an exploded perspective view of the object detection device.

In an exploded perspective view shown in FIG. 2, the object detection device 1 at least includes the cover member 100, a base member 400 (an example of another member) for attaching the device to a wall or the like, and an object detection circuit board 300 which is provided between the cover member 100 and the base member 400 and attached to the base member 400, and which has a detection-ray detecting element (in the present embodiment, infrared detection element) 320, a processing circuit, and the like. Normally, the cover member 100 and the base member 400 are fastened to each other (closed state), and at the time of opening the cover member 100, i.e., at the time of detaching the cover member 100 from the base member 400, as shown in FIG. 2, a fastening member (which may be referred to as lock part) 200 used in the fastening structure of the present embodiment is rotated (loosened) to protrude from the cover member 100, whereby fastening between the cover member 100 and the base member 400 is released.

<Fastening Member>

Figure 3:
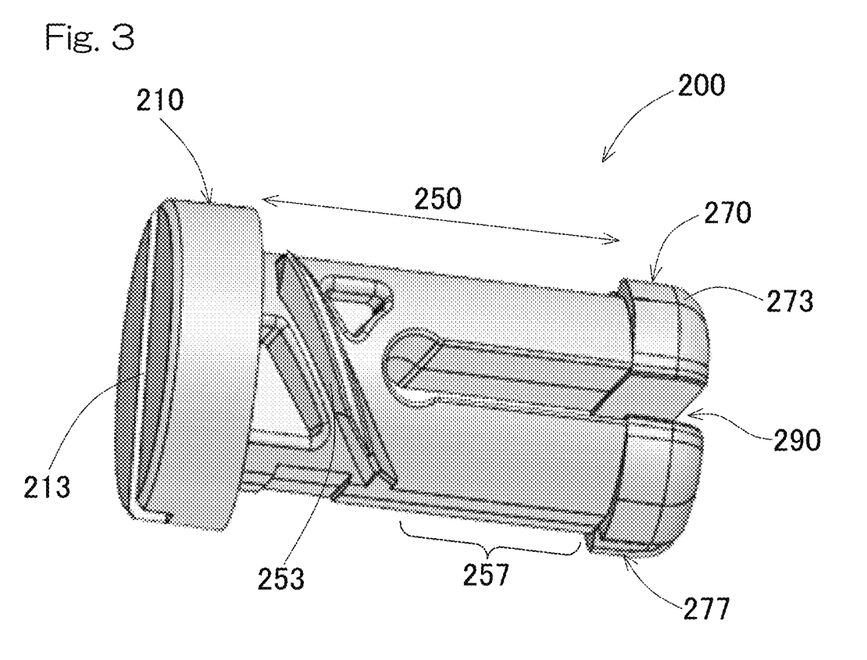
FIG. 3 is an external perspective view of a fastening member used in the fastening structure.

As shown in FIG. 3, the fastening member 200 of the present embodiment has a trunk portion 250 having a cylindrical shape (which may be a columnar shape), between one end 210 and another end 270. Here, the trunk portion 250 has a helical protrusion 253 at a part thereof, in the present embodiment, at a part on the one end 210 side. A part (hereinafter, may be referred to as curved surface portion) 257 other than the part having the helical protrusion is provided at a part on the other end 270 side of the trunk portion 250. The fastening member 200 has, at the one end 210, a tool groove 213 like a slot-shaped groove into which a slotted screwdriver is inserted, for example. In addition, the fastening member 200 has, at the other end 270, a come-off prevention portion 273 having a greater radius Rd in a cross-section thereof than a radius r in a cross-section of the trunk portion 250. That is, the radius r<the radius Rd is satisfied. Here, the above cross-sections are cross-sections along a plane perpendicular to the longitudinal-axis direction (hereinafter, simply referred to as axial direction), and in the present embodiment, have circular shapes. The lead angle and the pitch length of the helical protrusion 253 are adjusted to such values that, when a tool such as a slotted screwdriver is inserted into the tool groove 213 and is rotated by an angle exceeding 90 degrees having been conventionally used, i.e., in the present embodiment, preferably rotated by 180 degrees, the fastening member 200 protrudes from the cover member 100 by a predetermined length so as to be visually recognizable and thus fastening between the cover member 100 and the base member 400 is released, unlike the conventional case. In the present invention, the rotation angle is adjusted to 180 degrees in view of design, but the lead angle, the pitch length, and the rotation angle may be optimized in accordance with a required protrusion amount. The one end 210 of the fastening member 200 has a sense of unity in design with the cover member 100.

Further, the fastening member 200 of the present embodiment has, at the outer circumferential surface of the come-off prevention portion 273, an engagement portion 277 to be engaged with a to-be-engaged portion 477 arranged at the inner circumference of a to-be-fitted hole 473 (FIG. 5) described later, and has, at a part of the trunk portion 250 (in the present embodiment, approximately at the curved surface portion 257) and the come-off prevention portion 273, a cut-in portion 290 extending in the axial direction from the end surface of the other end 270. These portions will be described in detail later.

<Fastening Structure>

Figure 4:
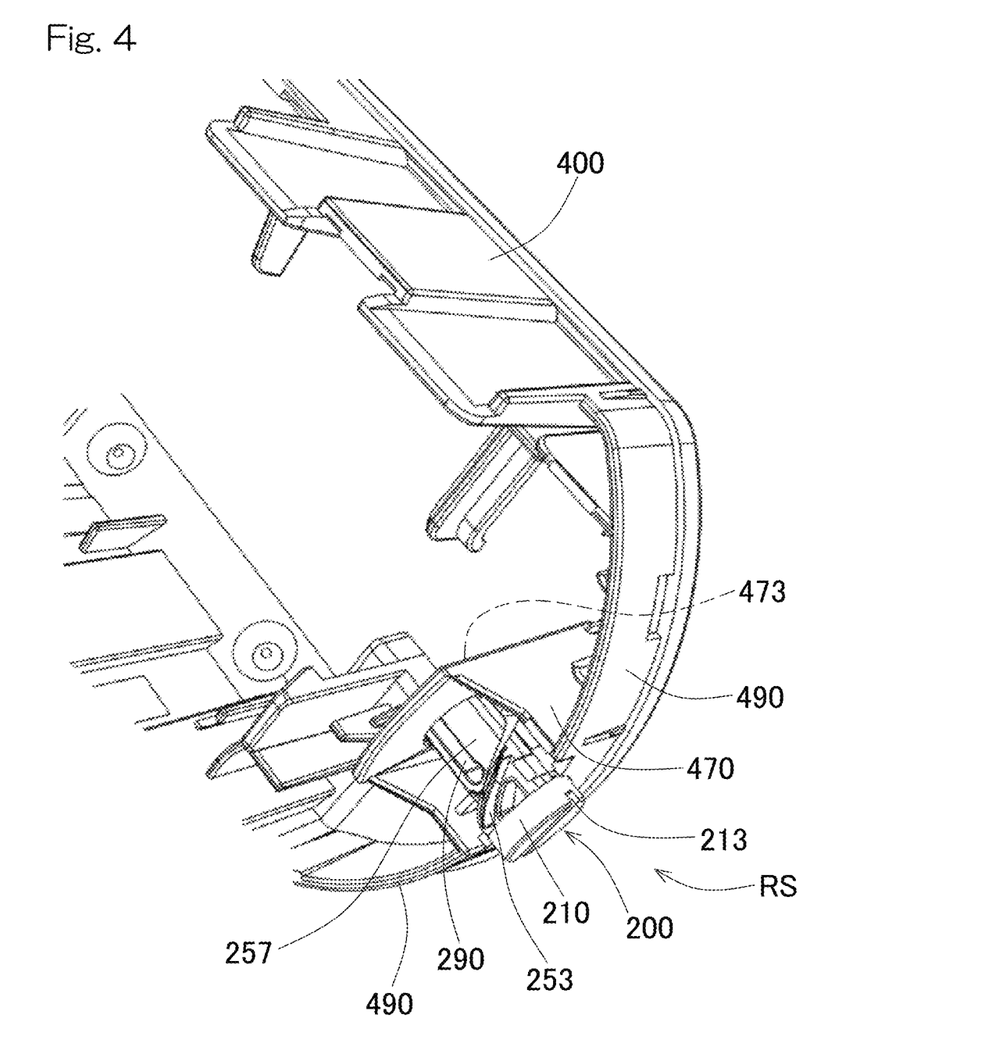
FIG. 4 is an internal perspective view showing the fastening structure in an enlarged manner.
Figure 6:
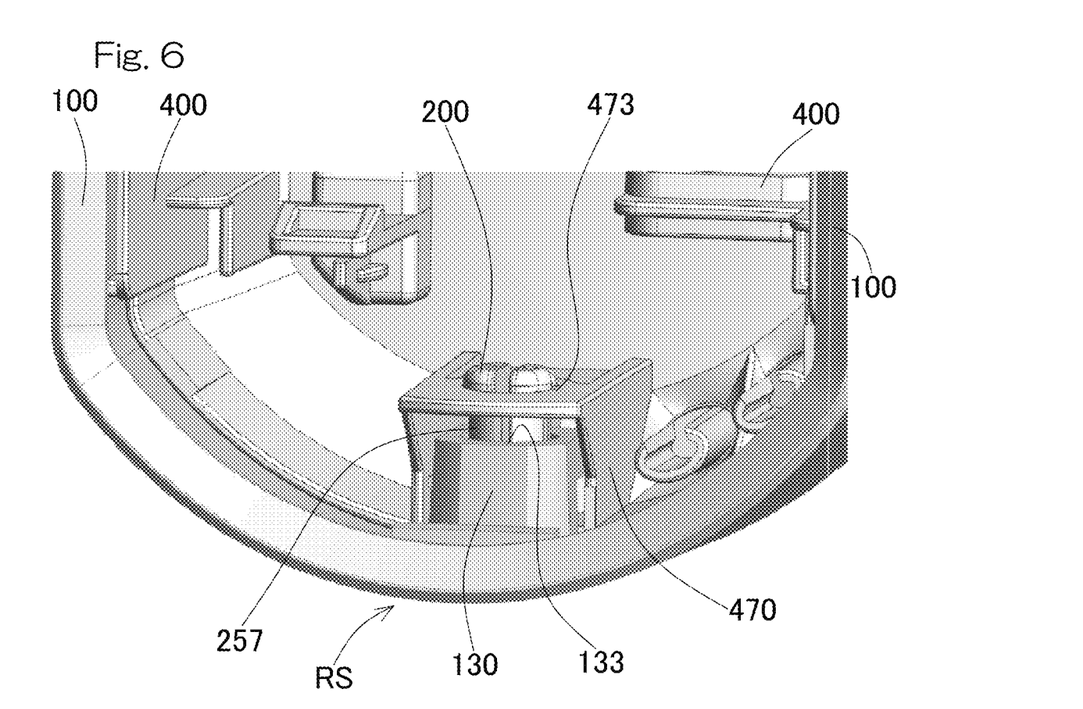
FIG. 6 is an internal perspective view showing a fitting portion and a to-be-fitted portion of the fastening structure in an enlarged manner.

FIG. 4 shows a perspective view including a fastening structure RS of the present embodiment. The fastening structure RS at least includes a fitting portion 130 having a fitting hole 133 in the cover member 100 and a to-be-fitted portion 470 having a to-be-fitted hole 473 in the base member 400 as shown in FIG. 6, and FIG. 4 mainly shows the to-be-fitted portion 470. The to-be-fitted portion 470 has such a shape that three flat plates standing upright from a main surface of the base member 400 are integrated, and communicates with a tall (outer peripheral) side wall 490 similarly standing upright from the main surface. In an event where the cover member in a closed state is forcibly opened from the base member, a lever-like member might be inserted from a gap. For such a case, the side wall 490 has a tall structure to be longer than the gap width so that a fulcrum is not provided to the inserted lever-like member. The fitting portion 130 has such a shape that a top flat plate and three flat plates standing upright from a main surface of the cover member 100 are integrated, and the dimensions and the shape thereof are set so that the fitting portion 130 is fitted to the inner side of the to-be-fitted portion 470.

Further, the fastening structure RS includes the fastening member 200 described above, and when the fastening member 200 is inserted into the to-be-fitted hole 473, the fitting portion 130 and the to-be-fitted portion 470 are fitted to each other as shown in FIG. 6. Here, the fastening member 200 is kept inserted in the fitting hole 133 without coming off from the fitting portion 130. That is, a radius Rk of the fitting hole is set to be less than the radius Rd of the come-off prevention portion 273 so that the fastening member 200 does not come off from the fitting portion 130, while the radius r in the cross-section of the trunk portion 250 is set to be less than the radius Rk of the fitting hole. Thus, in operation of detaching the cover member 100 from the base member 400, after the above rotation by 180 degrees, the fastening member 200 freely spins without coming off from the fitting portion 130.

Figure 5:
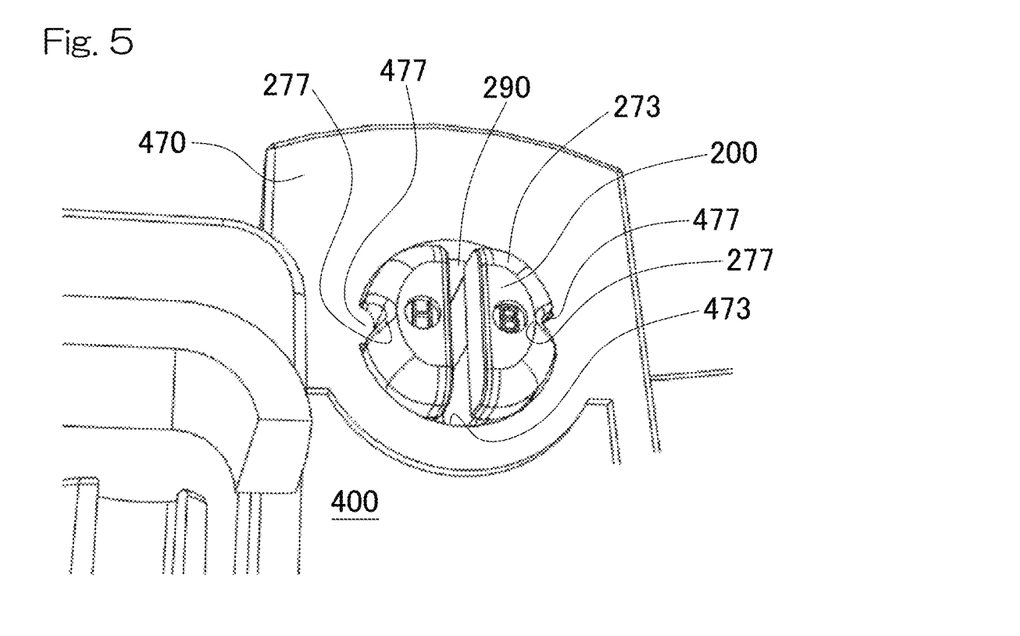
FIG. 5 is another internal perspective view showing the fastening structure in an enlarged manner.

FIG. 5 is a perspective view of the fastening structure RS of the present embodiment when looking at the to-be-fitted portion 470 side from the inside of the object detection device 1 toward the outside. In FIG. 5, the come-off prevention portion 273 of the fastening member 200 is inserted in the to-be-fitted hole 473 of the to-be-fitted portion 470. That is, a radius Rh of the to-be-fitted hole 473 is set to be not less than the radius Rd of the come-off prevention portion 273 so that the come-off prevention portion 273 can be inserted into the to-be-fitted hole 473. In the present embodiment, the to-be-engaged portions 477 having a projection shape and arranged at the inner circumference of the to-be-fitted hole 473 are provided at two locations opposed to each other, and the to-be-engaged portions 477 are engaged with corresponding two engagement portions 277 (which have a recess shape in the present embodiment) at the outer circumference of the come-off prevention portion 273. Owing to this engagement, when the fastening member 200 is inserted into or extracted from the to-be-fitted hole 473 by being rotated with the tool, a click-like feeling is transferred to the worker's hand gripping the tool. Thus, the worker can recognize start of operation of detaching the cover member 100 from the base member 400, and can recognize completion of the fastening in operation of attaching the cover member 100 to the base member 400.

Further, in FIG. 5, an opened part of the cut-in portion 290 in the fastening member 200 is shown. By compressing the come-off prevention portion 273 in the radial direction by fingers or the like so as to narrow the space in the cut-in portion 290, the come-off prevention portion 273 which has the radius Rd greater than the radius Rk of the fitting hole so that the fastening member 200 does not come off from the fitting portion 130 as described above can be inserted into the fitting portion 130, whereby it is possible to attach the fastening member 200 to the fitting portion 130. In addition, owing to the cut-in portion 290, the come-off prevention portion 273 is imparted with elasticity by a spring effect, whereby the above click feeling can be more assuredly provided.

Figure 7:
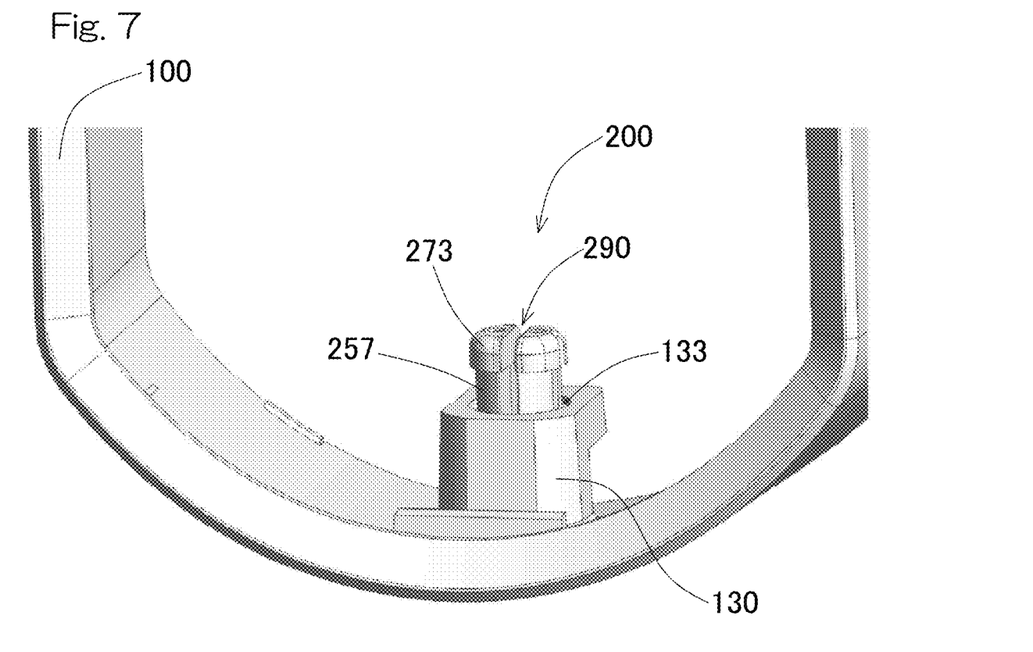
FIG. 7 is an internal perspective view showing the fitting portion of the fastening structure in an enlarged manner.
Figure 8:
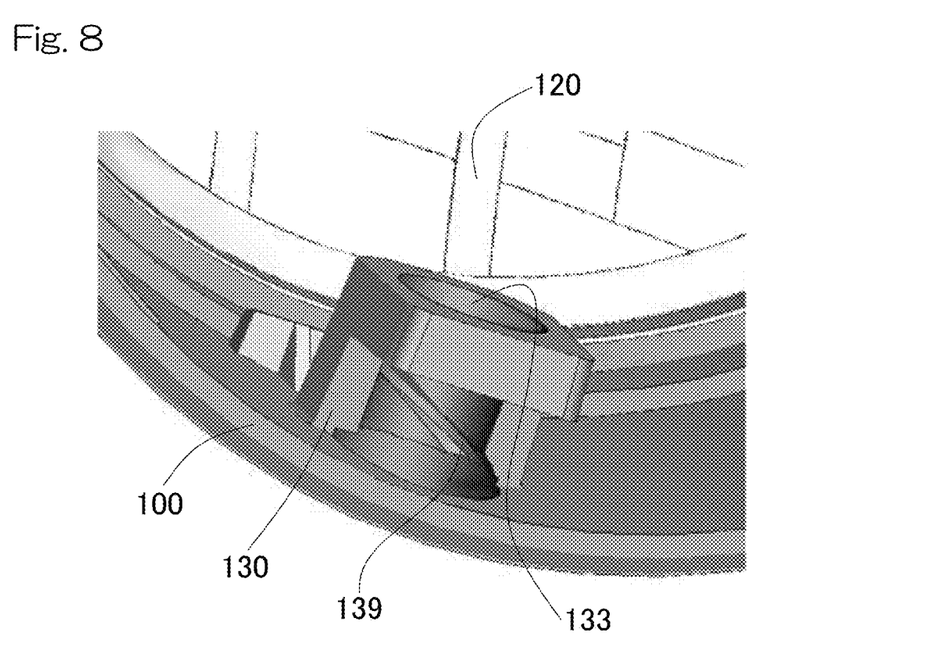
FIG. 8 is an internal perspective view showing a helical groove of the fitting portion of the fastening structure in an enlarged manner.
Figure 9:
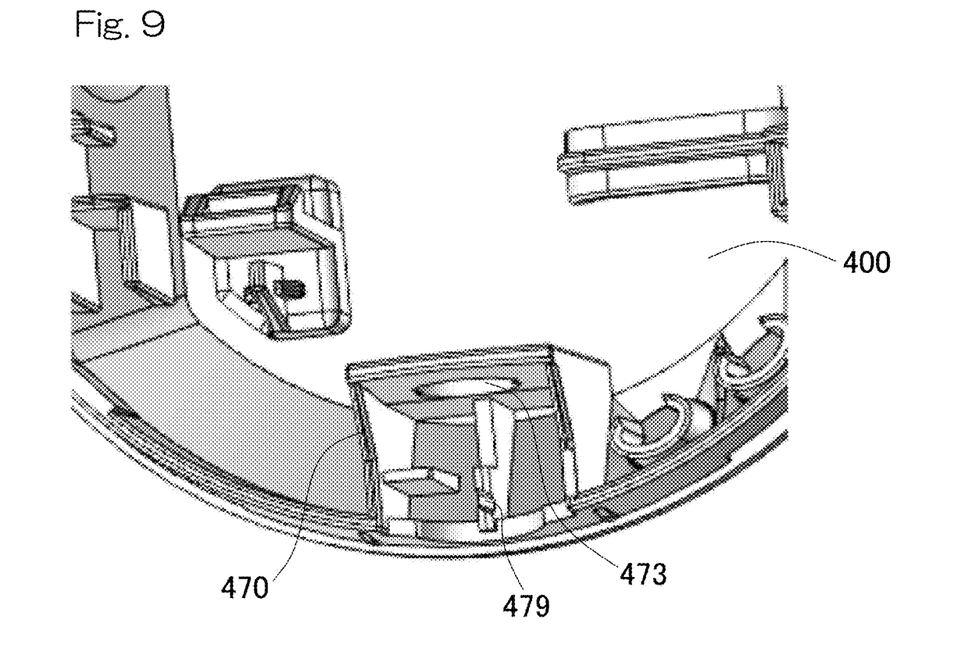
FIG. 9 is an internal perspective view showing a helical groove of the to-be-fitted portion of the fastening structure in an enlarged manner.

FIG. 7 shows the fitting portion 130 of the cover member 100, in the fastening structure RS of the present embodiment. In FIG. 7, the fastening member 200 is inserted in the fitting hole 133 and is prevented from coming off, by the come-off prevention portion 273, and the fastening member 200 can freely spin as described above by the curved surface portion 257 not having the helical protrusion. FIG. 8 shows a helical groove 139 of the fitting portion 130 to be screwed with the helical protrusion 253 of the fastening member 200. With this structure, when the tool is rotated, the helical protrusion 253 of the trunk portion 250 slides on the helical groove 139, whereby the fastening member 200 can be rotated and thus the fastening member 200 can be inserted into the to-be-fitted hole 473. In addition, with this structure, when the tool is reversely rotated, the fastening member 200 inserted in the to-be-fitted hole 473 is extracted from the to-be-fitted hole 473 and the fastening member 200 protrudes from the cover member 100. As shown in FIG. 9, the to-be-fitted portion 470 may have a helical groove 479 to be screwed with the helical protrusion 253 of the fastening member 200. In FIG. 9, the helical groove 479 is opposed to the helical groove 139 of the fitting portion 130 when the cover member 100 is attached to the base member 400. With this structure, the fastening member 200 can stably rotate while being screwed with two kinds of helical grooves, i.e., the helical groove 479 and the helical groove 139 that are opposed to each other on the same cylindrical surface.

<Operations and Effects of Above Fastening Structure>

With the above configuration, in the fastening structure RS of the object detection device 1 according to the present embodiment, the fastening member 200 inserted into the fitting hole 133 is also inserted into the to-be-fitted hole 473, whereby the fitting portion 130 having the fitting hole 133 in the cover member 100 and the to-be-fitted portion 470 having the to-be-fitted hole 473 in the base member 400 are fitted to each other, thus fastening the fitting portion 130 and the base member 400. Therefore, the fastening can be achieved by one component. In addition, the fastening member 200 has, at the other end 270, the come-off prevention portion 273 having a greater radius in the cross-section thereof than the radius in the cross-section of the trunk portion 250. Further, the radius of the fitting hole 133 is less than the radius of the come-off prevention portion 273, and the radius of the to-be-fitted hole 473 is not less than the radius of the come-off prevention portion 273. Therefore, the fastening member 200 does not come off from the fitting hole 133 and also can be inserted into the to-be-fitted hole 473, whereby the above fitting is achieved. Here, the fastening member 200 has the helical protrusion 253 at a part of the trunk portion 250, and the fitting portion 130 has the helical groove 139 to be screwed with the helical protrusion 253. Therefore, when the tool is inserted into the tool groove 213 and then is rotated, the fastening member 200 protrudes from the cover member 100 by a predetermined length, so that the fastening between the cover member 100 and the base member 400 can be released. Thus, at this time, the opened/closed state (fastening state) of the cover member 100 and the base member 400 can be confirmed just by looking. As described above, the fastening structure RS according to the present embodiment makes it possible to at least improve ease of visual recognition and achieve fastening by one component. As used herein, the one component may be an integrally formed product or may be an assembled product of a plurality of members. Therefore, the fastening member 200 may be one component formed from a plurality of members.

Although the present invention has been described above in connection with the preferred embodiment with reference to the accompanying drawings, the present invention is not limited to the above embodiment, and numerous additions, modifications, or deletions can be made without departing from the gist of the present invention. Accordingly, such additions, modifications, or deletions are to be construed as included in the scope of the present invention.

For example, although the present invention has been described using the fastening structure of the object detection device as an example in the above embodiment, the present invention is applicable to any fastening structure for fastening two members such as a box portion and a lid portion of a housing that stores an electric circuit, or the like, and may be applied to, other than the above example, a fastening structure for fastening two members such as a box portion and a lid portion of a housing of a numerical control panel for a working machine, a power meter, a power conditioner, or the like, or a housing that stores a modulation circuit, a demodulation circuit, a transformer circuit, or the like. In addition, other than such electric circuit application, the present invention may be applied to a fastening structure for fastening two members such as a box portion and a lid portion of a storage housing that stores a key, an electronic device, a valuable item, or the like.

REFERENCE NUMERALS

1 . . . object detection device
100 . . . cover member (one member)
130 . . . fitting portion
133 . . . fitting hole
139 . . . helical groove
200 . . . fastening member (lock part)
210 . . . one end
213 . . . tool groove
250 . . . trunk portion
253 . . . helical protrusion
257 . . . curved surface portion (part other than part having helical protrusion)
270 . . . other end
273 . . . come-off prevention portion
277 . . . engagement portion
290 . . . cut-in portion
300 . . . object detection circuit board
320 . . . infrared detection element (detection-ray detecting element)
400 . . . base member (other member)
470 . . . to-be-fitted portion
473 . . . to-be-fitted hole
477 . . . to-be-engaged portion
479 . . . helical groove
RS . . . fastening structure

What is claimed is:

1. A fastening structure for fastening one member and another member via a fastening member provided to the one member, the fastening structure comprising:
   a fitting portion having a fitting hole in the one member; and
   a to-be-fitted portion having a to-be-fitted hole in the other member;
   the fastening member being inserted into the fitting hole and configured to fit the fitting portion and the to-be-fitted portion to each other by being inserted into the to-be-fitted hole, wherein
   the fastening member has,
     a trunk portion having a cylindrical or columnar shape, between one end and another end of the fastening member,
     a tool groove at the one end,
     a come-off prevention portion at the other end, the come-off prevention portion having a greater radius in a cross-section thereof than a radius in a cross-section of the trunk portion, and
     a helical protrusion at a part of the trunk portion,
   the fitting portion has a helical groove configured to be screwed with the helical protrusion,
   a radius of the fitting hole is less than the radius of the come-off prevention portion, and a radius of the to-be-fitted hole is not less than the radius of the come-off prevention portion, and
   the helical protrusion is releasable from a screwed state with the helical groove so the fastening member is freely rotatable within the fitting hole when the one member and the another member are not fastened to each other.

2. The fastening structure as claimed in claim 1, wherein
   when a tool is inserted into the tool groove at the one end of the fastening member and then the tool is rotated, the helical protrusion of the trunk portion slides on the helical groove of the fitting portion and the fastening member rotates, so that the fastening member inserted into the fitting hole is inserted into the to-be-fitted hole, thus fastening the one member and the other member with each other, and
   when the tool is reversely rotated, the fastening member inserted into the to-be-fitted hole is extracted from the to-be-fitted hole and the fastening member protrudes from the one member, so that the fastening between the one member and the other member is released.

3. The fastening structure as claimed in claim 2, wherein the rotation of the tool is rotation exceeding 90 degrees.

4. The fastening structure as claimed in claim 1, wherein the fastening member is rotatable in a state in which the helical protrusion is released from a screwed state with the helical groove of the fitting portion.

5. The fastening structure as claimed in claim 1, wherein the fastening member has an engagement portion configured to be engaged with a to-be-engaged portion of the to-be-fitted hole.

6. The fastening structure as claimed in claim 1, wherein the fastening member has, at the come-off prevention portion and a part of the trunk portion, a cut-in portion extending in an axial direction from an end surface of the other end.

7. The fastening structure as claimed in claim 1, wherein the to-be-fitted portion has a helical groove configured to be screwed with the helical protrusion.

8. An object detection device comprising the fastening structure as claimed in claim 1, wherein
   the one member is a cover member and the other member is a base member, and
   an object detection circuit board having a detection-ray detecting element is stored between the cover member and the base member.

* * * * *